United States Patent [19]

Roberts

[11] Patent Number: 4,635,236

[45] Date of Patent: * Jan. 6, 1987

[54] SUBMERGED MARINE STREAMER LOCATOR

[75] Inventor: F. Alex Roberts, Brea, Calif.

[73] Assignee: Chevron Research Company, San Francisco, Calif.

[*] Notice: The portion of the term of this patent subsequent to Nov. 26, 2002 has been disclaimed.

[21] Appl. No.: 637,445

[22] Filed: Aug. 3, 1984

Related U.S. Application Data

[63] Continuation-in-part of Ser. No. 306,795, Sep. 29, 1981.

[51] Int. Cl.$^4$ .................... G01S 15/06; G01V 1/38
[52] U.S. Cl. .................................. 367/19; 367/6; 367/130
[58] Field of Search ................ 367/6, 16, 19, 20, 106, 367/130, 117; 181/110

[56] References Cited

U.S. PATENT DOCUMENTS

| | | | |
|---|---|---|---|
| 3,860,900 | 1/1975 | Scudder | 340/3 R |
| 4,037,189 | 7/1977 | Bell et al. | 340/6 R |
| 4,051,350 | 9/1977 | Parent | 364/432 |
| 4,063,213 | 12/1977 | Itria et al. | 340/7 PC |
| 4,064,479 | 12/1977 | Ruehle | 340/7 R |
| 4,087,780 | 5/1978 | Itria et al. | 340/7 R |
| 4,097,837 | 6/1978 | Cyr | 340/5 C |
| 4,110,726 | 8/1978 | Dorrance et al. | 340/6 R |
| 4,138,657 | 2/1979 | Shave | 340/3 |
| 4,290,123 | 9/1981 | Pickens | 367/13 |
| 4,299,809 | 10/1980 | Schwalbe | 367/6 |
| 4,555,779 | 11/1985 | Roberts | 367/6 |
| 4,840,845 | 10/1974 | Brown | 340/7 R |

FOREIGN PATENT DOCUMENTS 7029172 9/1972 France .

OTHER PUBLICATIONS

"A Dynamic Positioning System for the Mohole Drilling Platform", by R. W. Ragland, Honeywell, Inc.
"Acoustic Navigation Systems", by D. M. Sherwood, Bendix-Pacific Division.
"A High-Resolution Pulse-Dopper Underwater Acoustic Navigation System", R. C. Spinder, IEE Journal of Oceanic Engineering, vol. OF-1.
"CW Beacon System for Hydrophone Motion Determination", by R. P. Porter et al. Woods Hole Oceanographic Institute, The Journal of Acoustical Society of America.
"Instrumentation of Underwater Vehicle for High Precision Topographic Surveys", H. O. Torsen, NTNF Continental Shelf Division.
"Survey Techniques for Acoustic Positioning Arrays", D. L. McKeown, Navigation, Spring 1975, pp. 59-67.
"Acoustic Measuring System and its Performers", by C. C. Leroy, et al. Offshore Technology Conference, vol. I.

Primary Examiner—Nelson Moskowitz
Assistant Examiner—Gregory C. Issing
Attorney, Agent, or Firm—S. R. LaPaglia; E. J. Keeling; P. L. McGarrigle

[57] ABSTRACT

Method and means are provided for determining the position of a submerged marine streamer towed behind an exploration vessel. An array of sets of at least three transponders secured to the ocean floor generate distinguishable acoustic pulses upon a command signal. These signals are received by receivers housed in the streamer. The position to each receiver may be triangulated from the data generated.

7 Claims, 2 Drawing Figures

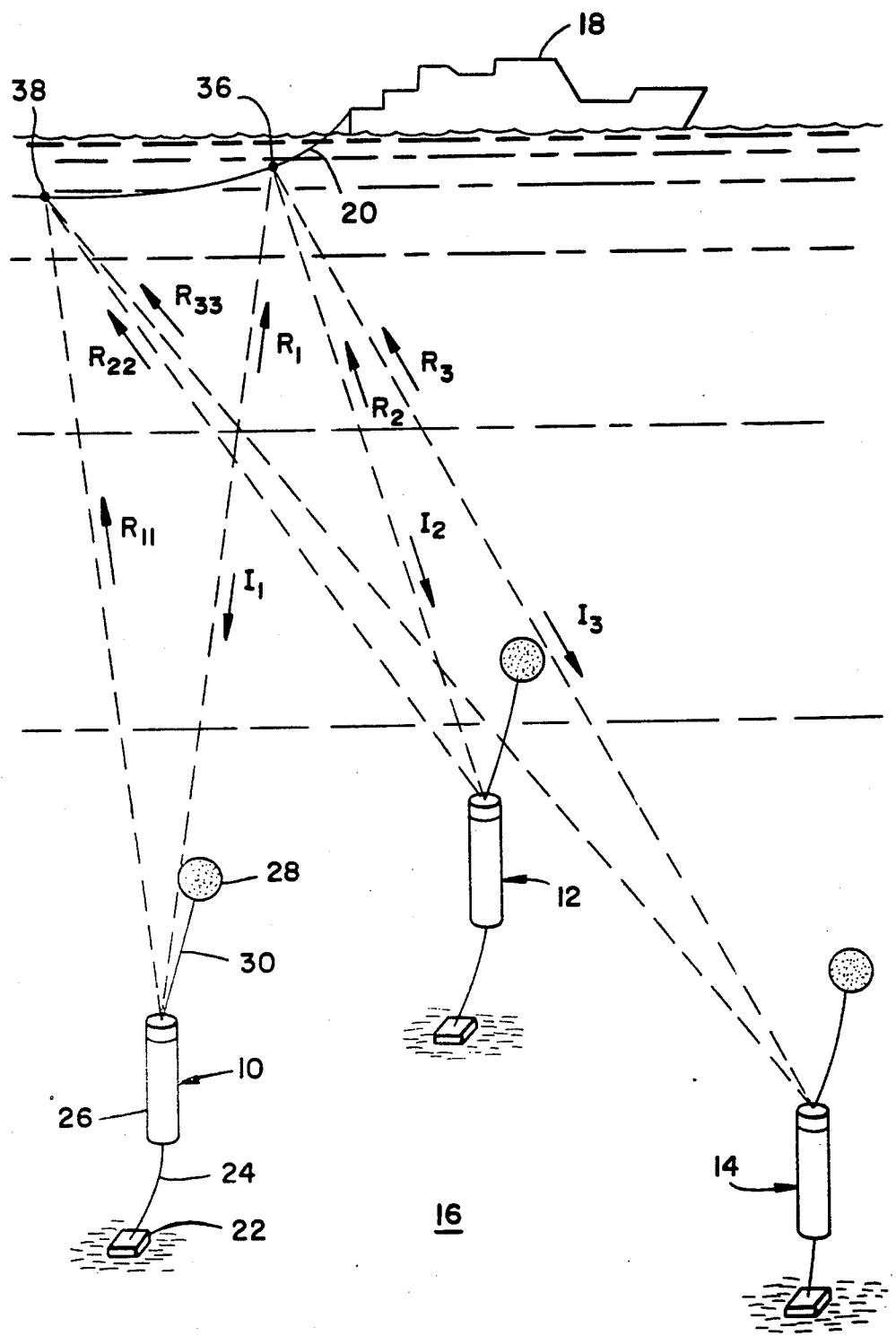
FIG _ 1

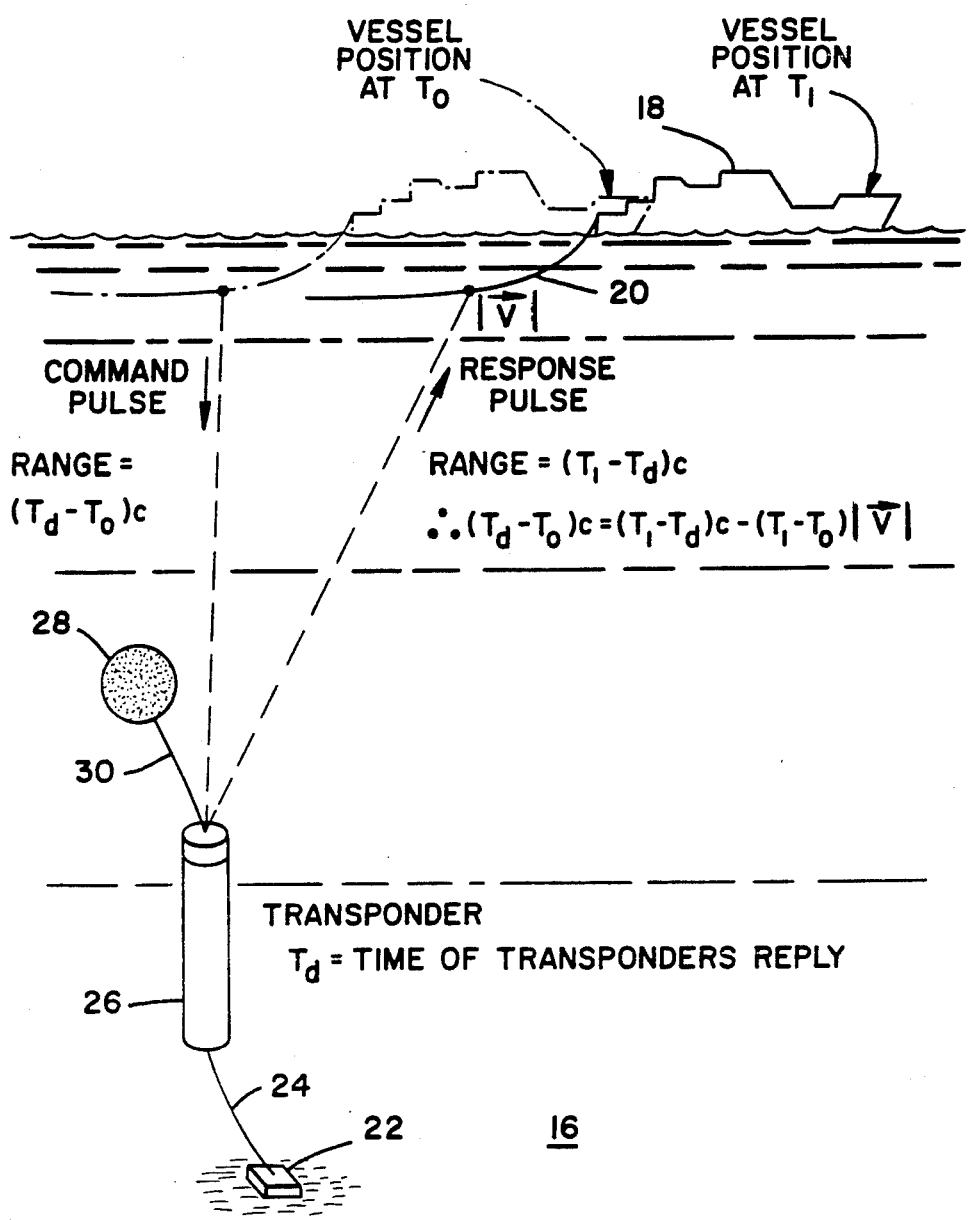
FIG_2

SUBMERGED MARINE STREAMER LOCATOR

CROSS REFERENCE TO RELATED APPLICATIONS

This application is related to U.S. continuation-in-part application Ser. No. 476,690 filed Mar. 3, 1983 and is itself a continuation-in-part of U.S. application Ser. No. 306,795 filed Sept. 29, 1981.

FIELD OF THE INVENTION

The present invention finds principal application within the field of marine seismic exploration. More particularly, the invention is concerned with means for accurately determining the position of a towed marine seismic streamer relative to fixed ocean bottom positions, including a correction for relative movement of the tow vessel and streamer with respect to the bottom positions.

BACKGROUND OF THE INVENTION

In marine seismic prospecting, an exploration vessel tows a seismic streamer having a plurality of pressure sensitive detectors, commonly referred to as hydrophones. A source of seismic energy, such as an air gun or an explosive charge, is used to propagate pressure waves through the water into the underlying sea floor. Part of the energy will be reflected by subfloor geological discontinuities and subsequently detected by the hydrophones as pressure variations in the surrounding water. The mechanical energy of these pressure variations is transformed into an electrical signal by the hydrophones and transmitted through the streamer to a recording apparatus aboard the vessel. The collected data may then be interpreted by those skilled in the art to reveal information about the subsea geological formations. Modern methods of seismic data collection use redundant subsurface coverage by successive source-hydrophone positions. This allows the data to be stacked to enhance the signal to noise ratio.

For the signals to be meaningful and to permit correct stacking of signals from different source and hydrophone positions, it is necessary to know the placement of the individual hydrophones at the time the pressure waves are detected. As the vessel is continuously moving and as the streamer may extend for thousands of feet behind the vessel, accurate location of the streamer hydrophones relative to fixed positions at the underwater bottom is difficult.

Various systems have been developed to provide accurate information as to the location of the vessel. In a common application a plurality of underwater transponders generate unique output frequency signals in response to an interrogation signal from the ship. The transit time for the interrogation signal and the transponder's response signal is measured and the distance or range from each transponder is calculated. The vessel's position with respect to the transponders may then be triangulated if the location of the transponders are known.

It has also been proposed to measure the distance from an underwater vessel from a tow vessel using the plural transponders and an additional transponder in the underwater vessel. However, none of the signals receive from any of the transponders indicate relative velocity between the bottom positioned transponders and either the towed vessel or any of a plurality of locations along the towed cable.

However, it is rare for the streamer to trail directly along the path of the vessel. While the streamer is attached to the stern of the vessel, the bulk of the streamer is submerged below the water surface through the action of depth controllers along the length of the streamer. As a result, the cross-track current at the streamer depth may differ from the cross-track current affecting the vessel, thereby causing the streamer to trail at an angle to the vessel's course. Other factors, which are not necessary to enumerate, may also create a variance in the path of the streamer when compared to the vessel track.

One method of estimating the location of the streamer disclosed in the prior art relies upon the addition of a tail buoy radar reflector located at the end of the streamer. On-board radar systems may then be used under optimal sea conditions to find the end of the streamer and the location of the individual hydrophones interpolated. Such systems are generally unreliable however, and render the required data suspect.

A second method taught by the art relies upon very sensitive and expensive apparatus to measure the yaw and pitch angles of the streamer end adjacent the vessel. These data, coupled with magnetic compass headings taken along the streamer and the known depth of the streamer, permits one to empirically calculate the hydrophone locations.

It is an object of this invention to provide an accurate, alternative means for locating the submerged streamer relative to known underwater locations which adequately account for relative motion between the streamer and such locations during traverse of a seismic line with the streamer.

SUMMARY OF THE INVENTION

The present invention relates to a method and apparatus for use in determining the location of a submerged marine streamer towed behind an exploration vessel. The system basically comprises of spaced acoustic receivers carried by the streamer and at least one acoustic transducer-receiver which is designed for cooperation with a plurality of sea floor transponders. The streamer transducer-receiver is capable of emitting interrogation signals to the sea floor transponders when triggered from the vessel. Communication between the vessel and the individual streamer transducer-receiver and the receivers is accomplished through conventional channels carried by the streamer. The streamer acoustic receivers are capable of receiving and distinguishing sonic pulses of different frequencies and transmitting unique signals responsive thereto along communication channels in the streamer to the vessel. At least three transponders are conventionally affixed to the sea floor in known geographical locations in the survey area. These transponders are capable of responding to the interrogation signals from the streamer transducer-receiver by emitting signals of differing frequencies.

Conventional means are provided for measuring the time interval between the initiation of the interrogation signal and the receipt of the signals relayed along the streamer from the acoustic receivers and the transducer-receiver in response to the sea floor transponders.

Normally, the position of the interrogating transducer-receiver is determined by the mean travel time to and from each of at least three sea floor transponders. Receivers situated physically near the interrogating transducer, in comparison to the water depth, can also be positioned by using the mean travel time between the initial interrogation pulse and the received replies to each receiver. The accuracy of this method is a function of how near the mean travel time is to the true travel time from each sea floor transponder to each receiving point.

To accurately position points along a moving, physically long and flexible submerged object such as a seismic streamer, the time instant at which each sea floor transponder replies is needed to calculate the true range from the transponder to each receiving point along the streamer. The present invention presents a method of determining this instant in time at which each sea floor transponder replies from a knowledge of the velocity of the streamer transducer-receiver with respect to the sea floor transponders and knowledge of the above-measured time intervals.

The streamer transducer-receiver velocities, with respect to each sea floor transponder, may be approximated from the speed and direction of the vessel, calculated from the rate of change of the range data to the transducer-receiver, or measured by Doppler shift of the transponder signals to the transducer-receiver.

Normally, one streamer transducer-receiver is used at the vessel end of the streamer and then an acoustic receiver is placed every 250 to 500 meters along the streamer length. At least three sea floor transponders are placed at a sufficient distance apart to give adequate range to the streamer receivers in a given water depth. In general, the array of sea floor transponders will necessarily be more closely spaced for the shallower waters encountered.

BRIEF DESCRIPTION OF THE DRAWINGS

FIG. 1 of the drawings illustrates a transponder set shown in relationship to a surface exploration vessel towing a marine streamer.

FIG. 2 of the drawings diagrammatically illustrates the effect of ship movement on the acoustic paths between the streamer and bottom transponder.

DETAILED DESCRIPTION OF THE PREFERRED EMBODIMENTS

The present invention requires the placement of at least three acoustic transponders on, or adjacent, the ocean bottom. Preferably, the transponders will be positioned on the sea floor in non-colinear sets of at least three transponders per set. A plurality of sets are placed in a generally colinear array at spaced intervals between the set centers of 500–1000 meters. Each of the transponders is preferably placed at a sufficient distance apart to give adequate range to the streamer receivers and transducer-receiver in a given water depth. While the present invention is concerned with location of the vessel streamer with respect to given transponders and not with respect to their actual geographical location, the latter relationship may be established from knowledge of the transponder placement. Well known methods are described in the art for determination of the transponder placement and calibration and are therefore not to be considered here.

Referring to FIG. 1 of the drawings, there is shown a single set of three acoustic transponders, indicated generally by reference numerals 10, 12 and 14, positioned on the sea floor 16. A moving exploration vessel 18 is shown on the surface towing a streamer 20.

Transponders of the type required are commercially available and normally comprise a base plate 22, resting on the sea floor, and a cable 24 attached between the base plate 22 and the transponder body 26. A float 28 connected to the transponder body 26 by means of a cable 30 maintains the transponder body 26 at an attitude above the sea floor determined by the length of cable 24. Float 28 also provides a means of retrieval if cable 24 is severed accidentally or by some release mechanism.

The moving marine streamer 20 towed behind vessel 18 is submerged below the water surface by a plurality of conventional depth controllers (not shown) and will normally house hydrophones (not shown), and depth sensors (not shown) which may be interrogated from the vessel for information.

In addition, the streamer will also house a plurality of acoustic receivers 38 spaced along the length of the streamer at intervals in the range of 250–500 meters and one transducer-receiver 36. The receivers 38 and transducer-receiver 36 are linked to the vessel through separate channels. The transducer-receiver 36 may be triggered to emit acoustic command signals to the ocean floor transponders. Preferably, all transponders in the array will respond to a single frequency signal emitted by the streamer transducer, although coded signals may be used to actuate individual sets of transponders, if desired. The transducer-receiver 36 and receivers 38 in the streamer are also capable of receiving acoustic pulses from the ocean floor transponders within operating ranges and relaying signals to the vessel 18 through the streamer 20 responsive to the pulses.

To determine the location of the receivers 38 and transducer-receiver 36, and thus the streamer 20 position, a streamer transducer-receiver 36 is triggered to send an acoustic command signal. Upon receipt of the signal, after the delay in transmission time through the water, each ocean floor transponder within range transmits an acoustic pulse of a distinguishable frequency. These pulses are detected by the sending transducer-receiver 36 and all of the streamer receivers 38 which are within acoustic range. For the sake of clarity, acoustic travel paths are only shown in FIG. 1 of the drawing as dashed lines for a moving single streamer receiver 38 and the transducer-receiver 36, in the streamer within range of the sea floor set. It should be understood, however, that similar paths could be drawn for each of the receivers 38 housed in the streamer within range. Arrows $I_1$, $I_2$ and $I_3$ represent the command pulse travelling along the dashed lines from the streamer transducer-receiver 36 to the sea floor transponders; arrows $R_1$, $R_2$, and $R_3$ represent the responsive pulses from the sea floor transponders to the streamer transducer-receiver 36; and arrows $R_{11}$, $R_{22}$, and $R_{33}$ represent the same responsive pulses to the streamer receivers 38. Since the spatial positions of the transponders on the sea floor 16 and the speed of sound through the water are known, the transducer-receiver 36 and receiver 38 positions may be determined from knowledge of the travel time for each pulse from their respective transponders.

Suitable means aboard the vessel are provided to measure the time interval between the sending of the command signal and the receipt of the responsive pulses from the streamer receivers 38 and the transducer-receiver 36.

In FIG. 2 of the drawings, there is illustrated a vessel moving along the water's surface at time $T_0$ and at a subsequent time $T_1$. As shown therein, the streamer transducer-receiver 36 initiates a pulse at time $T_0$ which travels approximately along the indicated path to the sea floor transponder. Upon receipt of the signal at time $T_d$ the transponder transmits a pulse which is detected by the streamer transducer at time $T_1$. From the figure it may be derived that the time, $T_d$, is given by the formula:

$$T_d = T_0 + \frac{(T_1 - T_0)}{2}\left(1 - \frac{|\vec{v}|}{c}\right)$$

wherein $|\vec{v}|$ is the magnitude of the streamer transducer-receiver's 36 velocity with respect to the sea floor transponder and $c$ is the propagation speed of the acoustic pulses.

The $$\frac{|\vec{v}|}{c}$$

ratio may be determined in a number of ways. For instance, the ratio may be approximated from the rate of change of range of each sea floor transponder to the transducer-receiver 36. This range rate may also be determined readily from knowledge of the vessel's position and speed with respect to the transponders.

The ratio $$\frac{|\vec{v}|}{c}$$

for normal ship speeds during seismic operations will usually be less than 0.002, since $|\vec{v}|$ is about 3 meters per second and c is about 1,500 meters per second. If the $$\frac{|\vec{v}|}{c}$$

term is dropped then:

$$T_d = T_0 + \frac{(T_1 - T_0)}{2}$$

which will result in an error of less than 0.2% in the range calculations to each receiver 38. An error of this magnitude may be acceptable for some of the ocean depths encountered in oil industry exploration and for some types of seismic operations, but in general only for reconnaissance surveys, not for detailed high resolution structure surveys.

In relatively shallow water and where the bottom transducers are closely spaced, say less than a mile apart, such an error can seriously deteriorate the value of the collected seismic data since the structural details will not be adequately defined from such data. For example, for seismic data taken with the transponders spaced apart from each other two miles and at an average depth of 150 meters, range errors and hence errors in calculating the positions of the hydrophones would be on the order of from 5 to 15 meters. Positional errors of this magnitude can mask and possibly obliterate important structural details in the data stacking process.

As previously stated, the $$\frac{|\vec{v}|}{c}$$

ratio may be determined in a variety of ways. For greatest technical accuracy of such determination, a preferred method relies upon measurement of the Doppler shift in the received frequency from the transponder. Naturally, in order to determine the velocity in this manner, the transponders must be capable of generating pulses of very stable frequencies and the vessel receiver must be capable of measuring the apparent change in the frequency.

Because the initial cost of such stable frequency transponders, as well as cost for their maintenance, may not be justifiable, a simpler yet highly effective method for obtaining such data is provided in accordance with the present invention which employs only the passive, or low-power active receivers in the seismic cable, as described above, and the same bottom transponders. Accordingly, an economically preferred method of calculating this ratio is from the rate of change of range between the transponders and the transducer-receiver 36. This range rate may be determined readily from a knowledge of the transducer-receiver's position change with respect to the transponders.

Specifically, the value $|\vec{v}|$ is, of course, $$\frac{\delta R}{\delta t},$$

the rate of change of range in the direction of the transducer-receiver 36 relative to each ocean bottom transponder. This range rate is available from a plurality of measurements of the recorder range data. In practice, the seismic vessel is required to run a track of 3 to 4 kilometers in line with the seismic data line to straighten the streamer before the seismic data taking run begins. Because the vessel speed is normally less than 3 meters per second and at constant headway, its track and the track of the transducer-receiver 36 since it is on the streamer 20 near the vessel 18, is straight over several recordings of the range position. In this way, the average change in range of the transducer-receiver 36 relative to each transponder is available by recording and averaging several range measurements. For example, three determinations of range may be averaged and then for successive measured positions and using each new measurement of range, the first or earliest of the three measurements is dropped and the last, or newest, measurement added and the new total average together. Initial values of $|\vec{v}|$ may be assumed from vessel speed, (or even equated to zero) and then made to converge to the average value from progressive updating of a few sets of such measurements. In this way, the average rate of change in transducer-receiver 36 position is recorded for solution of the triangulation problem with a high degree of accuracy, but without use of additional costly equipment as to either bottom transponders or vessel and cable detection equipment.

Knowledge of the time, $T_d$, for the initiation of the pulses from the transponders and the measured time of pulse detection by the receivers in the streamer 20, as transmitted to the vessel 18, permits the calculation of the distance from each transponder to each receiver 38. These distances may then be triangulated to give the location of each receiver 38 in a streamer 20 in real time by a shipboard computer or from the recorded data in post mission analysis and the precise location of the detectors relative to the underwater bottom position on the seismic traces established.

What is claimed is:

1. Apparatus for use in determining relative to known geographic locations on a sea floor the position of a moving submerged marine seismic streamer while being towed through the sea by an exploration vessel, which comprises:

a plurality of spaced apart acoustic receivers and at least one acoustic transducer-receiver carried by said streamer, said transducer-receiver being capable of emitting acoustic command signals when triggered by means controllable from the moving vessel and said receivers being capable of receiving and distinguishing distinctly different acoustic frequencies to transmit distinguishable signals responsive thereto along the streamer to recording means on the vessel;

at least three sea floor transponders spatially displaced from each other at known positions relative to the sea floor and each of the transponders being capable of responding to a single acoustic command signal from said transducer-receiver in said moving streamer while being towed by said vessel, each of said transponders emitting signals of a distinctly different frequency; and means for recording the time interval from initiation of a command signal from said streamer transducer to the receipt of each signal relayed along said streamer from each of said receivers in response to said signals from said transponders, whereby the distance of each of said streamer receivers from each of said known positions of said transponders may be calculated.

2. Apparatus as recited in claim 1, which further comprises:

means for determining the velocity of the streamer transducer-receiver with respect to each of said sea floor transponders.

3. Apparatus as recited in claim 2, wherein there is at least one streamer receiver per 250 to 500 meters of streamer length.

4. A method for determining the position of a moving submerged marine seismic streamer relative to a known sea floor location while being towed by an exploration vessel, which comprises:

generating an acoustic command signal from a transducer carried by said moving streamer;

receiving said acoustic command signal by at least three transponders spatially separated and located at known positions relative to the sea floor, each of said transponders being responsive to said acoustic command signal to emit acoustic signals having a frequency distinctly different from the other two transponders;

detecting the sea floor transponder acoustic response signals with at least one streamer receiver and transmitting a response signal corresponding to each of said distinct transponder signals along the streamer to the vessel;

measuring the time interval from generation of the acoustic command signal to receipt of each of said response signals transmitted from the receiver along the streamer to the vessel;

determining the velocity of the streamer transducer with respect to each of said sea floor transponders; and determining the position of the streamer transducer and the streamer receivers relative to a known sea floor location.

5. The method as recited in claim 4 wherein the acoustic command signal and the response signals are generated at spaced-apart locations along said streamer.

6. The method as recited in claim 5 wherein the the receivers are spaced along said streamer every 250 to 500 meters.

7. The method as recited in claim 5 wherein a set of transponders is centered every 500–1000 meters along the length of the ship's track.

* * * * *